United States Patent [19]

Ho

[11] Patent Number: 4,543,973
[45] Date of Patent: Oct. 1, 1985

[54] LIQUID LEVEL CONTROL APPARATUS AND METHOD

[76] Inventor: Giong Ho, 4328 E. 67th St., No. 680, Tulsa, Okla. 74136

[21] Appl. No.: 654,652

[22] Filed: Sep. 25, 1984

[51] Int. Cl.$^4$ ............................................. F16K 31/34
[52] U.S. Cl. ..................................... 137/1; 137/270; 137/390; 137/413; 137/416; 137/85
[58] Field of Search ............... 137/85, 1, 270, 390, 137/413, 416, 15

[56] References Cited

U.S. PATENT DOCUMENTS

| | | | |
|---|---|---|---|
| 2,649,771 | 8/1953 | Parks | 137/413 |
| 3,088,485 | 5/1963 | Hanssen | 137/413 |
| 3,120,241 | 2/1964 | Parks | 137/413 |
| 3,413,997 | 12/1968 | Taylor | 137/270 |
| 3,840,044 | 10/1974 | Harris et al. | 137/413 |

OTHER PUBLICATIONS

Pending U.S. patent application Ser. No. 537,783, Glasgow, et al.
The Wellmark Company, Oklahoma City, Oklahoma.
Safety Equipment, Inc., Tulsa, Oklahoma.

*Primary Examiner*—George L. Walton

[57] ABSTRACT

A pneumatic liquid level control apparatus and method providing both a snap-actor mode and a throttling mode by rotating a control means on the apparatus. The control means has a reciprocating valve means mounted inside which is operative in the snap-actor mode and which is inoperative when the control means is rotated to the throttling mode. The control means is mounted on the apparatus housing so that it can be moved between its snap-actor mode and its throttling mode by merely loosing screws for affecting the movement and then tightening the screws to begin operation.

17 Claims, 12 Drawing Figures

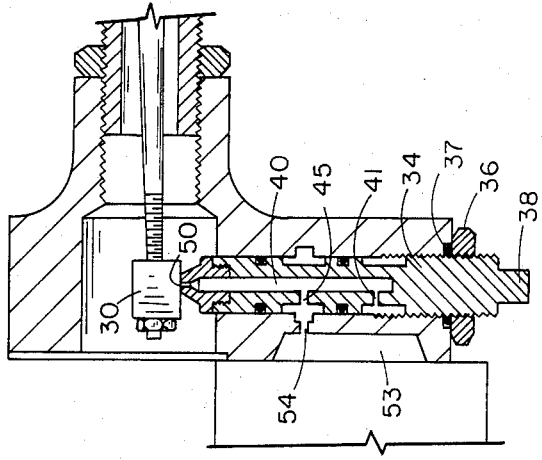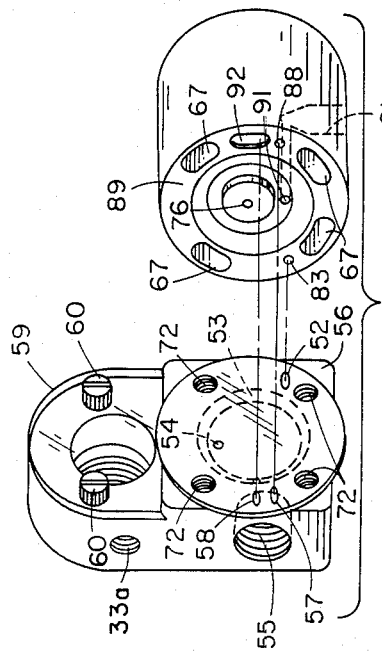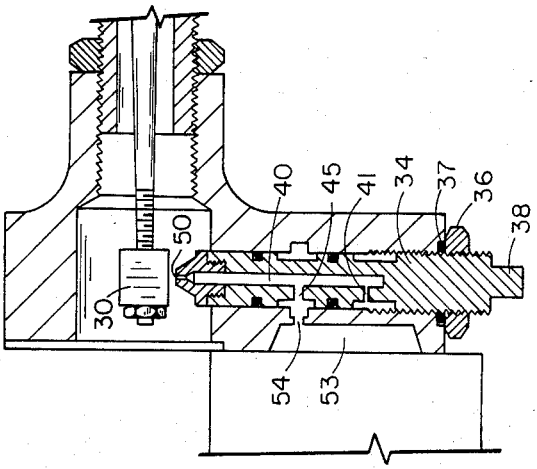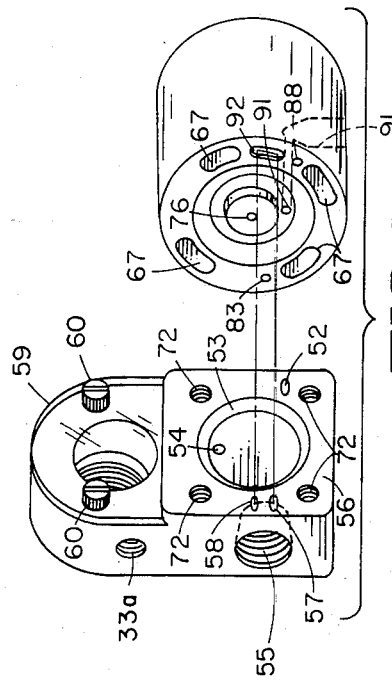

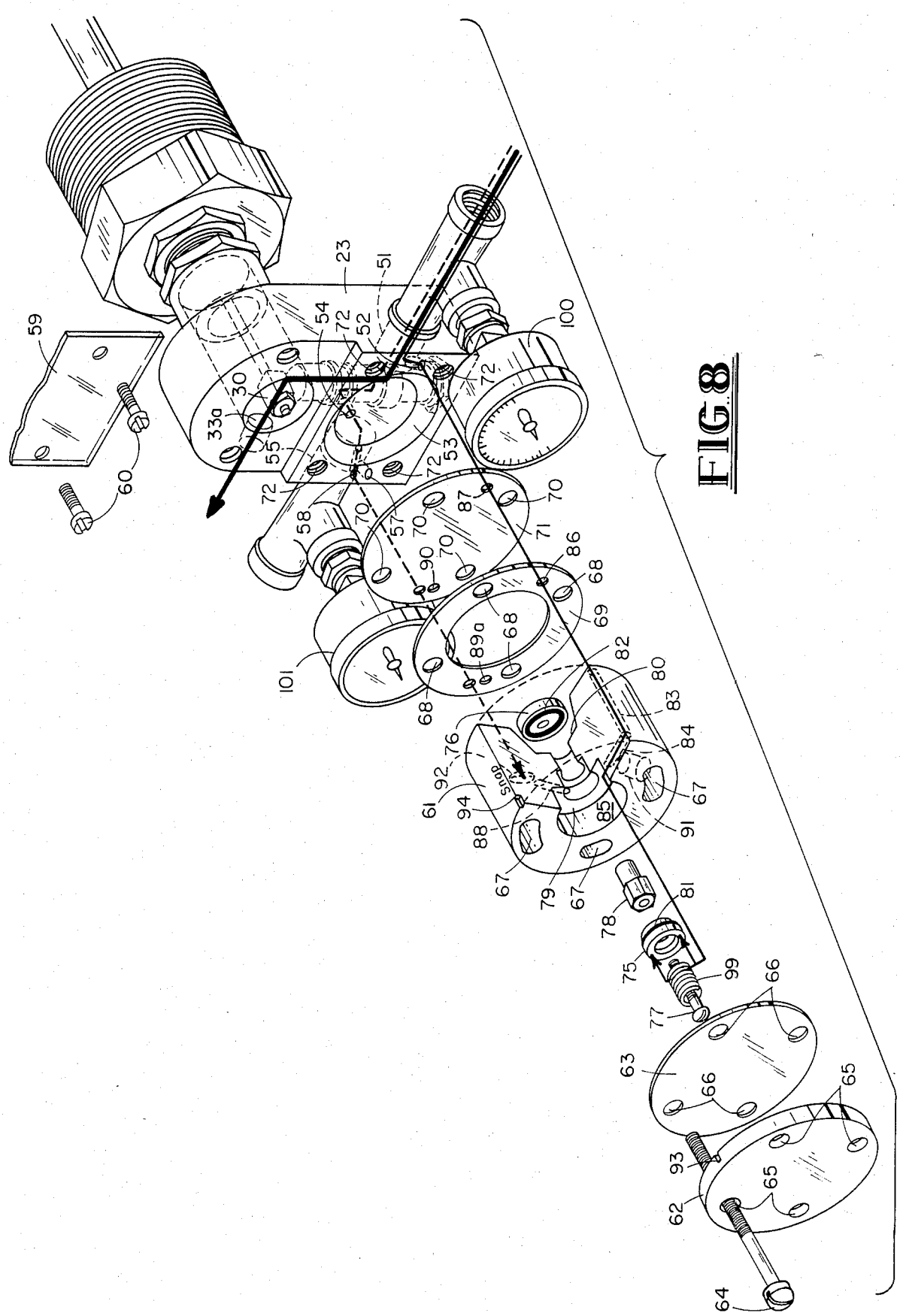

LIQUID LEVEL CONTROL APPARATUS AND METHOD

BACKGROUND OF THE INVENTION

This invention relates to a liquid level control device. In particular, it relates to a control head on the device which can be changed from the snap-actor mode to the throttling mode without removal or addition of any parts.

It has been known in the art to provide a control head on a liquid level control device which has both a snap-actor and throttling mode of operation. An example of such a device is shown in pending U.S. patent application Ser. No. 537,783 filed Sept. 30, 1983 which is commonly owned by the assignee of this application. Another example of such a device is shown in U.S. Pat. No. 3,840,044 issued Oct. 8, 1974 to Lewis K. Harris et al. Some other patents related to the invention are U.S. Pat. No. 2,649,771 issued Aug. 25, 1973 to A. S. Parks, U.S. Pat. No. 3,413,997 issued Dec. 3, 1968 to J. L. Taylor and U.S. Pat. No. 3,088,485 issued May 7, 1963 to A. J. Hanssen.

The above U.S. Pat. No. 3,840,044 and pending U.S. patent application Ser. No. 537,783 are incorporated herein in toto by specific reference thereto.

These snap-actor and throttling control heads are used in connection with liquid level control devices. The devices have particular uses as pneumatic liquid level controls. In particular, they may be used to control liquid levels in oil well pressure vessels. Oil and gas wells generally produce natural gas and a mixture of water and hydrocarbons. The pressure vessels separate the water from the hydrocarbons. Because the level of liquid in the pressure vessel cannot be allowed to vary much, a liquid level control device is needed which is sensitive to small changes in liquid level in the vessel. The natural gas produced can be used to open or close a gas actuated motor valve which drains or adds liquid to the vessel by flowing the gas through a liquid level control device and to a gas actuated motor valve, which in turn controls the liquid level, and the cycle is repeated. The device may also be used for many other types of liquid level control. Also, if sufficient gas is not present from the well, it may be supplied from an outside source to the device by compressed air or the like.

It is desirable that liquid level control devices be able to operate in all weather conditions. Because the gas used, particularly natural gas, may contain water vapor which will freeze if the ambient temperature falls below the dew point, it is necessary to provide a device which works in all temperature extremes. In temperatures above the dew point, a liquid level control device can operate in a "throttling mode". This mode keeps liquid at a constant level and allows liquid to be drained gradually from the vessel. Gas flow through the device to the gas operated motor valve at a variety of volumes depending on the level of liquid in the vessel. The gas flow is constantly choked to some degree at a small orifice. However, if water vapor in the gas flowing through the control device starts to freeze, ice or condensate may be built up on the small orifices used in the throttling mode and cause liquid level upsets in the vessel. In this situation, a device which operates in a "snap-actor" mode is preferable.

The snap actor mode allows the liquid level in the vessel to be controlled between predetermined limits by nozzle adjustment in relation to float position. Some fluctuation in liquid level is tolerable. Fluctuation of the liquid level produces either full supply gas pressure to the liquid level control device, which causes the drain valve controlled by the device to open to its fullest open position and drain the vessel, or no supply gas pressure because the supply gas is completely vented from the liquid level control device, which causes the vessel drain valve to fully close. The time interval between these operations provides a warming interval for the control device to dissipate any forming of ice at the orifices. Also, when gas flows through the control device during the full open position of the liquid level control device, the gas pathway through the device uses larger flow orifices than those used in the throttling mode so that blockage due to icing is reduced.

While other devices have been known which are capable of shifting between a snap-actor mode and a throttling mode, none has achieved the shift in modes with the simplicity and ease of operation of the present invention. In particular, in U.S. patent application Ser. No. 537,783, one must put in a pipe plug such as plug 84 shown in FIG. 1 of said pending application and must switch the control screws by opening one and closing another. In order to achieve this function with U.S. Pat. No. 3,840,044, it is necessary to remove and switch certain components. In the field, this may create problems in the event small parts are dropped or lost.

It is an object of the present invention to provide a control head for a liquid level control device which may be changed from the snap-actor mode to the throttling mode without dismantling the device or adding any additional elements. In particular, it is an object of the invention to provide a control head which may be easily converted from one mode to another by merely loosening the booster head assembly from the control assembly and rotating it between two preselected positions. It is another object of the invention to provide a device which may be switched between the two operating modes without adding any additional elements. It is another object of the invention to provide a device which can be switched between two modes without dismantling or removing any parts from the device. It is also another object of the invention to provide a device which can be quickly changed between the two operating modes with common tools such as a screwdriver. Other objects of the invention will become apparent from the following detailed disclosure.

SUMMARY OF THE INVENTION

The invention relates to a liquid level control device embodying the use of a float and cantilever rod to control the level of liquid in a vessel. Gas is supplied to the liquid level control device from an outside source, and the flow of gas through the device is controlled by the cantilever rod and float. The mode of gas flow through the device can be alternated by a control head on the device. The gas, in turn controls the drainage of liquid from the vessel. The control head operates in a throttling mode and a snap-actor mode, the throttling mode being used at ambient temperatures above freezing while the snap-actor mode is used with ambient temperatures below freezing. To change from the snap-actor to the throttling mode, or vice versa, screws are loosened which hold the booster body of the control head to the housing of the control device, the booster body is rotated to change from one mode to the other, and the screws are retightened.

BRIEF DESCRIPTION OF THE DRAWINGS

FIG. 2 is a cross-sectional elevational partial view showing the details of the level adjusting member when the sensing rod seat exposes the level adjusting member orifice.

FIG. 3 is a cross-sectional elevational partial view showing the details of the level adjusting member when the sensing rod seat closes the level adjusting member orifice.

FIG. 4 is a partial elevation view viewed from the left of FIG. 1 showing the device in its throttling mode.

FIG. 5 is a partial elevation view viewed from the left of FIG. 1 showing the device in its snap-actor mode.

FIG. 8 is an exploded partial view showing the device in the snap-actor mode.

BRIEF DESCRIPTION OF THE PREFERRED EMBODIMENT

Figure 1:
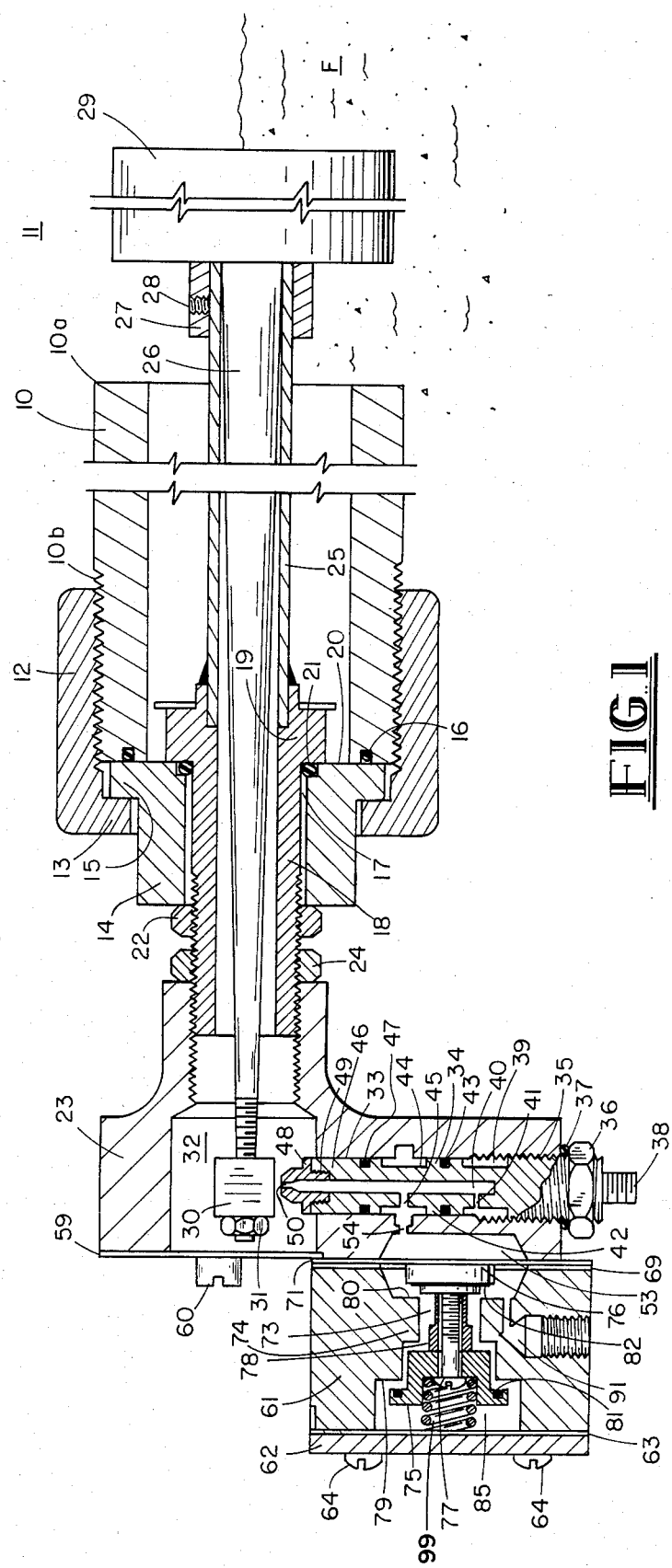
FIG. 1 is a cross-sectional elevational view of an embodiment of the invention.
Figure 7:
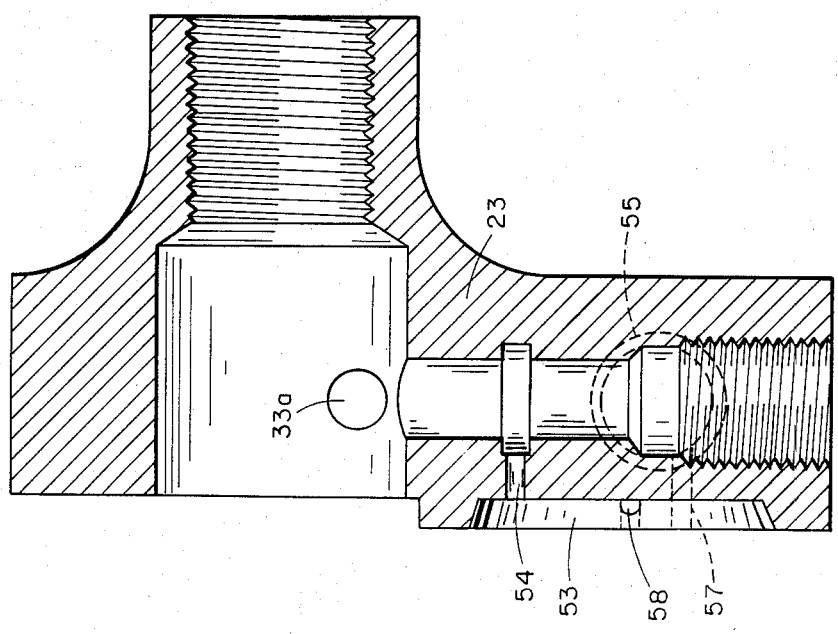
FIG. 7 is a partial cross-sectional view taken along line 7—7 from FIG. 6.

Referring now to FIG. 1 of the drawings, the preferred embodiment of the apparatus is shown. The invention will be described as it is particularly applicable for providing a pneumatic control signal in response to the fluid level in a vessel. A weld neck 10 may be connected at its outer end 10a to an opening in a vessel. A conventional threaded connection or a flanged connection could also be used to connect the control device to a vessel 11. The vessel 11 contains fluid F which may be made up of more than one type of fluid of different specific gravities. The exterior portion of the weld neck 10 includes threaded portion 10b. The threaded portion 10b receives a threaded union 12 having a retaining lip 13. A flange 14 includes a flange portion 15 which is clamped between the union 12 and the weld neck 10. O-ring 16 forms a seal. The flange 14 includes a cylindrical opening 17 which receives a tube flange adapter 18. A flange member 19 on the tube flange adapter 18 engages the inner surface 20 of the flange 14 and forms a seal therewith to O-ring 21. A nut 22 is threadably mounted upon the tube flange adapter 18 to retain the tube flange adapter 18 in sealing relationship to the flange 14. The tube flange adapter 18 is threaded such that it may be screwed into mating threads in the control housing 23. A lock nut 24 prevents unscrewing of the tube flange adapter 18.

At the outer end of the tube flange adapter 18 is a cantilever rod 25 which is welded to the tube flange adapter 18 to form a seal at its outer end. Running through the center of the cantilever rod 25 is an enlongated sensing rod 26. The sensing rod 26 is secured to the cantilever rod 25 by welding means or other means known in the art. A collar 27 is slideably mounted upon the cantilever rod 25 by simple means such as a set screw 28. A float 29 is mounted on the outer end of the rod 25. Various configurations of the cantilever rod assembly based on vessel size, buoyancy requirements, specific gravities of fluids, or temperatures may be used and the floats may be made of any suitable materials such as phenolics, plastics such as Delrin, aluminum and other suitable materials. The outer end of the rod 26 extends into the housing 23, is threaded and includes a sensing seat 30 which is held in position by a lock jam nut 31. As will be apparent, the sensing seat 30 extends into a cavity 32 in the housing 23. Extending downwardly through the housing 23 is a cylindrical passageway 33. The passageway 33 receives the elongated level adjusting member 34 which is secured thereto by threaded connection 35. A lock or jam nut 36 mounts upon the lower portion of the member 34 and engages an O-ring 37 to form a seal with the bottom of passageway 33. A wrench flat 38 is provided for rotating the member 34.

Figure 6:
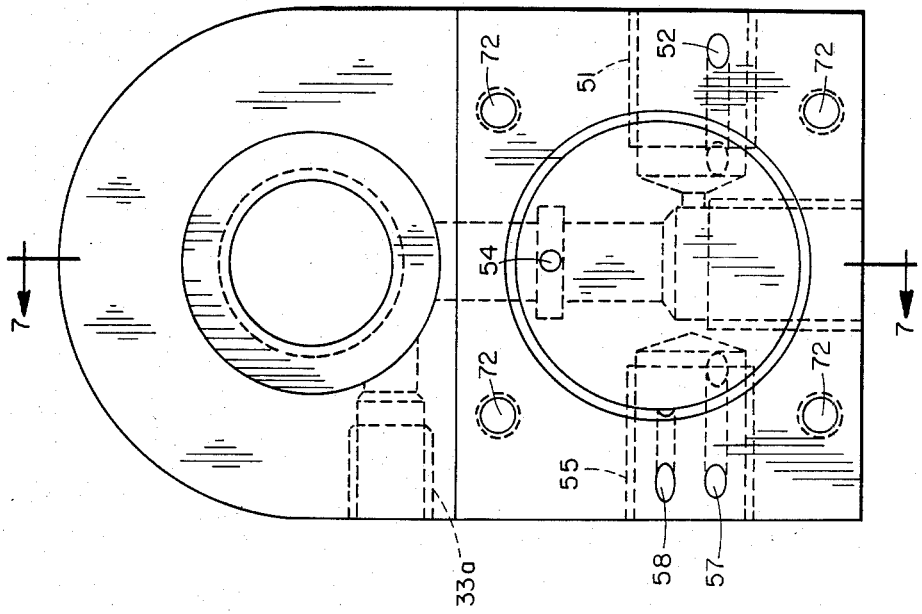
FIG. 6 is a partial elevation view with the control means removed.

The member 34, as shown in FIG. 1, includes a lower reduced diameter portion 39. The member 34 further includes a central passageway 40 extending from the top of number 34, downwards partially through the member 34. A small supply gas inlet orifice 41 communicates the passageway 40 to the recess 39 for a reason as explained more fully hereinafter. The member 34 further includes a lower enlarged portion 42 including an O-ring seal 43 which sealingly engages the passageway 33. An upper recess portion 44 is positioned above the enlarged portion 42. A booster orifice or passageway 45 communicates with the passageway 40 and the recess portion 44. An upper enlarged portion 46 is positioned above the upper recess portion 44 and includes an O-ring 47 to affect the seal with the passageway 33. An orifice nozzle 48 is connected to the member 34 by screw threads 49 and includes an orifice 50, the top of which is engaged by the sensing rod seat 30 to control free exhaust of the supply gas, as explained later. In operation, movement upwardly or downwardly of the float 29 moves the seat 30 upwardly or downwardly to alternately engage and seal off the orifice 50 or to disengage and allow flow of gas through the orifice 50. This action is shown in FIG. 2 and 3. As shown in FIG. 8, gas is supplied to the control device at a pressure shown on gauge 100. The supply gas is supplied to the recess portion 39 through a threaded inlet passageway 51, shown in FIG. 6, extending through the housing 23. Supply gas also flows through an access opening 52, which connects the supply gas wih the control head, to be described later. Access opening 52 is shown in FIGS. 6 and 8. A truncated conical recess 53, shown in FIGS. 1 and 8, is formed in the outer face of the housing 23. A passageway 54 extends through the housing 23 to communicate with the recess portion 44 and the orifice 45. Opposite the inlet passage 51 is an outlet passage 55, shown in FIGS. 4, 5, 6, 7 and 8. Gas exiting the control device through outlet passage 55 and acts on a gas actuated motor valve not shown, at a pressure shown on gauge 101. The flow of gas to the motor valve controls the flow of liquid out of the vessel 11. In the outer face 56 of the housing 23 is a passageway 57 which communicates with the outlet passage 55. A second passageway 58 is drilled into the housing face 56 and communicates the housing face 56 with the conical recess 53. The two passageways 57 and 58 are shown in FIGS. 4, 5, 6, 7 and 8. A sight-glass plate 59 is attached to the housing by laterally spaced screws 60 to seal off the cavity 32 in housing 23. See FIGS. 4, 5 and 8. The plate 59 protects the cavity 32 from outside elements.

Referring to FIGS. 1 and 8, the control head is now described. A booster body 61 is mounted upon the housing 23. A cover member 62 seals the outer end of the booster body 61 through cylindrical gasket member 63, which is constructed of a suitable plastic which does not bond to the material of the booster body 61 and cover 62 for a reason explained more fully hereinafter. A plurallity of screws 64 extend through hole 65 in the cover 62, hole 66 in the gasket 63, slotted or rectangular passageway 67 through the booster body 61, through hole 68 in plastic gasket 69, through hole 70 in the thin rubber diaphragm 71 and inthreadably engage tapped holes 72 in the housing 23. As will be apparent, tighting of the screws 64 sealingly connects the above described components which constitute the control means to the control device. A cylindrical passageway 73 extends through a flange portion 74 in the center of the booster body 61, as shown in FIG. 1. A reciprocating valve means operates through passageway 73 and includes a first seat 75 and a second seat 76 which are connected by screw 77, with spacer 78 mounted between seats 75 and 76 in the passageway 73. See FIGS. 1 and 8. The valve seat 75 engages the face 79 and the valve seat 76 engages the face 80, as shown in FIG. 1, to regulate the flow of supply gas. The valve seat 76 includes a threaded opening which engages the screw 77. The spacer 78 separates the valve seats 75 and 76 by a predetermined distance, as shown in FIG. 1, so that the seats will not simultaneously engage their respective faces. The valve seats 75 and 76 include rubber engaging portions 81 and 82, shown in FIGS. 1 and 8, to affect seals when they engage faces 79 and 80, respectively. A compression spring 99, shown in FIGS. 1 and 8, fits inside the outer recess of seat 75 and around screw 77 and comes into contact with gasket 63. The spring 99 keeps the reciprocating shuttle valve biased toward the right (as shown in FIG. 1). From the inner face of the booster body 89 which engages the gasket 69, a passageway 83 extends partially through the booster body 61. See FIGS. 4, 5 and 8. A second passageway 84, shown in FIG. 8, communicates with the passageway 83 and the recess portion 85 formed by the seat 79. The passageway 83 communicates through hole 86 in gasket 69, hole 87 in diaphragm 71 and passageway 52 in the housing 23. See FIG. 8. Pressurized air or gas is supplied to passageway 83 only when the booster body 61 is in the snap-actor mode. A passageway 88, shown in FIG. 8, extends from the inner face 89 of the booster body 61 through to the cylindrical opening 73. The passageway 88 communicates with the hole 89a in the gasket 69, hole 90 in the diaphragm 71 and passageway 57 when the booster body is in the snap-actor mode, as shown in FIG. 8. An exhaust vent hole 91 is drilled into the lower portion of the booster body 61 and communicates with the inner recess 80 which contains the seat for the seat member 76. See FIGS. 1, 4 and 5. A recess slot 92, shown in FIGS. 4 and 5 is also provided on the face 89, and is more fully explained hereinafter.

As shown in FIG. 8, the booster body 61 is moveable by rotating it within the limitations of the screws 64 which extend through the slotted openings 67. An indicator mark 93 on the cover 62 is fixed. An indicator mark 94 on the moveable booster body 61 indicates the snap-actor mode when it is aligned with the indicator mark 93. Another indicator mark 95 on the moveable booster body 61 may be aligned with the indicator mark 93 on the cover when the booster body 61 is in the throttling mode. See FIGS. 8 and 11.

Assuming the booster body 61 is rotated to the snap-actor mode and the sensing rod seat 30 is in the open position as shown in FIG. 2, the flow of supply gas through the apparatus is shown in FIG. 8. The supply gas would pass through passageway 51, passageway 52, passageway 83 and passageway 84 to work with the spring 99 to engage the first seat 75 and move it to the right (as shown in FIG. 1) until seat 75 forms a seal with surface 79. Since this blocks the flow of gas through the booster body 61, the supply gas would then continue into the lower recessed part of member 34 at recess 39. Then the gas flows through the orifice 41 through passageway 40 and out through orifice 50 and vent hole 33a. No gas is bled through passageways 45 and 54 because after the gas travels through passageway 58, it is stopped by recess 92. Finally, with no other means of exit, the gas will flow out orifice 50 and out the vent hole 33a. The vent hole 33a is tapped so that a tubing may be connected to it to direct the vent gas away from the unit.

Figure 9:
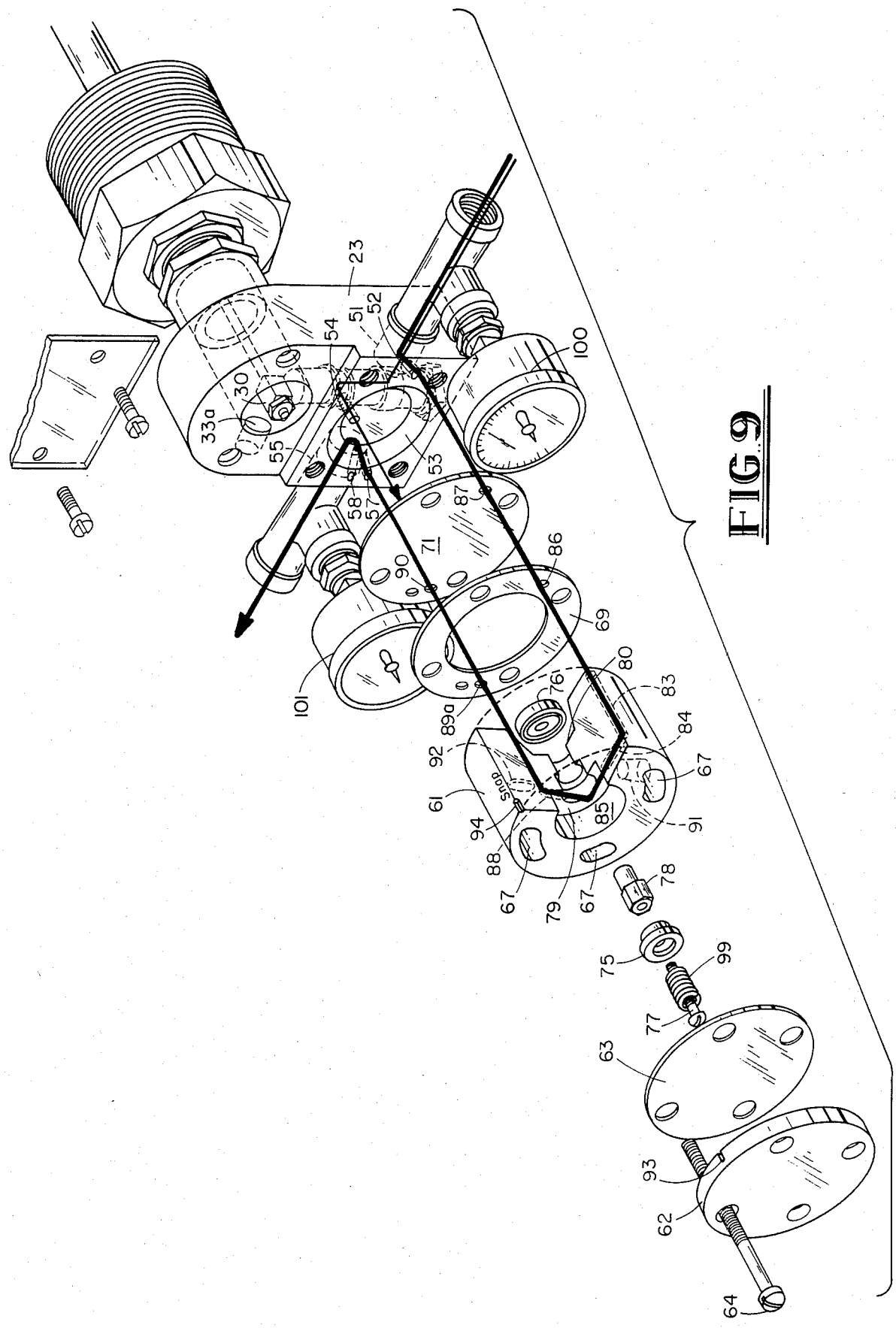
FIG. 9 is an exploded partial view showing the device in the snap-actor mode.

When the flow of liquid into the vessel exceeds the flow of liquid out of the vessel as controlled by the gas actuated motor valve, the float 29 will rise, moving the sensing rod seat 30 downwardly to seal the orifice 50, as shown in FIG. 3. The pressurized gas in the passageway 40 will then flow through the orifice 45 and through the passageway 54 and energize the inner seat 76 by pressure from diaphragm 71 causing seat 76 to shift to the left (as shown in FIG. 1) into sealing arrangement with the face 80. This operation is shown in FIG. 9 which shows the flow of gas through the booster body 61 when the seat 75 is moved off its sealing engagement with the face 79 and the seat 76 is moved to its sealing engagement with its face 80. The pressurized gas then flows through the passageway 52, passageway 83, passageway 84, passageway 88 and passageway 57 to connect it with the outlet 55. Outlet 55 is connected to a controller or gas actuated motor valve which, as explained earlier, controls the amount of fluid being removed from the vessel. The operation described in FIG. 8 occurs when the liquid level in the vessel is below the float 29. The float 29 is at its lower predetermined limit during the operation described in FIG. 8, and during this time no fluid is drained from the vessel. For the operation described in FIG. 9, the float 29 is at its uppermost predetermined level. The flow of fluid F out of the vessel is commenced by gas actuated motor valve because of the operation shown in FIG. 9.

Figure 10:
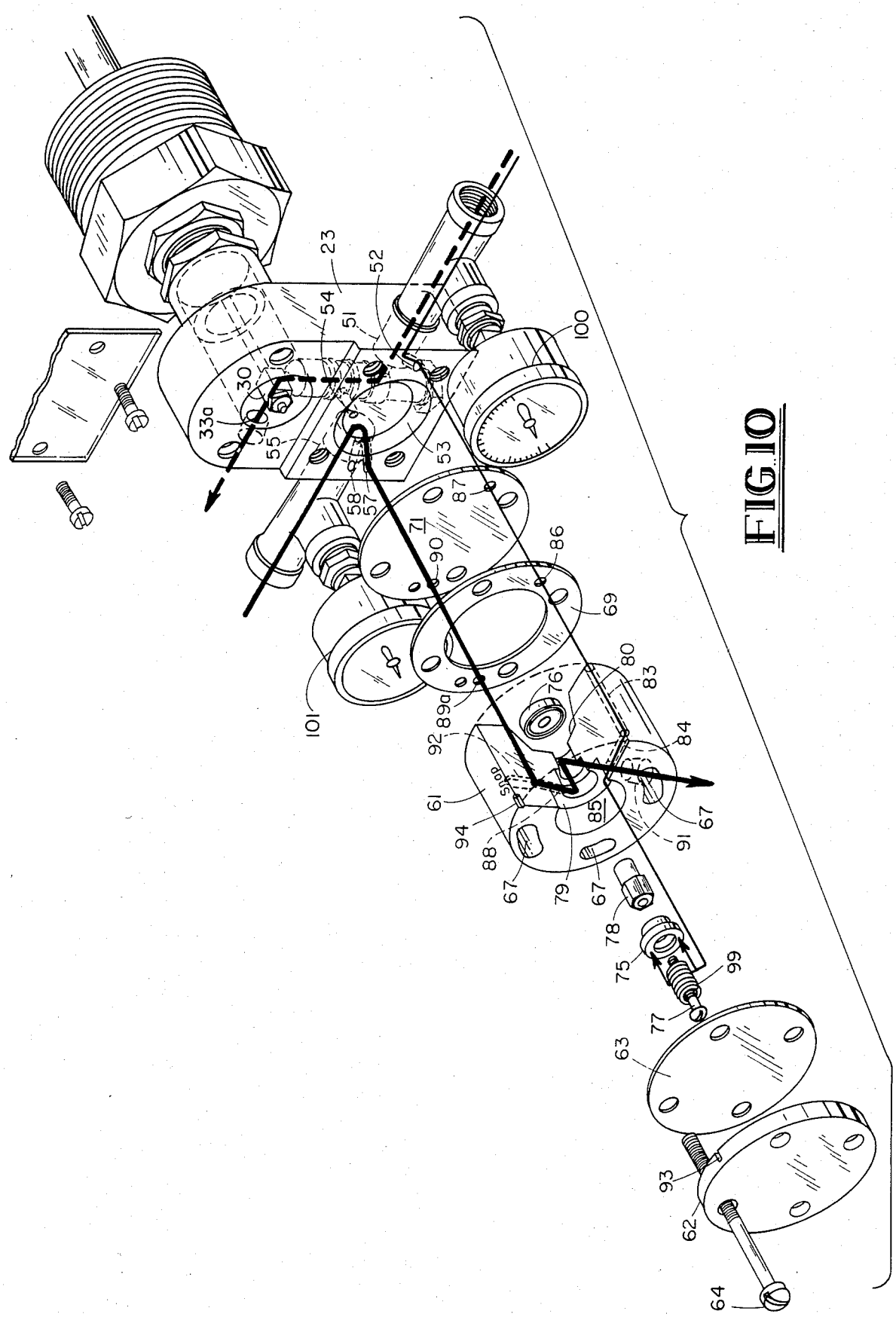
FIG. 10 is an exploded partial view showing the device in the snap-actor mode.

FIG. 10 shows the operation occurring between the operations of FIG. 9 and FIG. 8. When the sensing rod seat 30 is unseated, the supply gas is then again vented through the orifice 50 and out the vent hole 33a. The pressure is then reduced against the diaphragm 71 which allows the reciprocating shuttle valve to move to the right (as shown in FIG. 1). This then vents the line 55 as gas passes through outlet passage 57, passage 88, through the passage 73 and out the vent hole 91 on the face 80 of the booster body 61. This operation supplies some gas under pressure to the outlet passage 55 to control the gas actuated motor valve, and the rest is vented by vent hole 33a. This operation maintains the liquid level of the vessel within predetermined limits determined by the movement of the sensing rod 26. As will be apparent, the orifice 50 may be adjusted closer or further away from the sensing rod seat 30 to determine the limits of liquid level between the points where the pressurized gas is supplied to the outlet 55. As mentioned earlier, in the snap-actor mode, the gas actuated motor valve allowing flow of fluid out of the vessel is usually fully open or fully closed.

Figure 11:
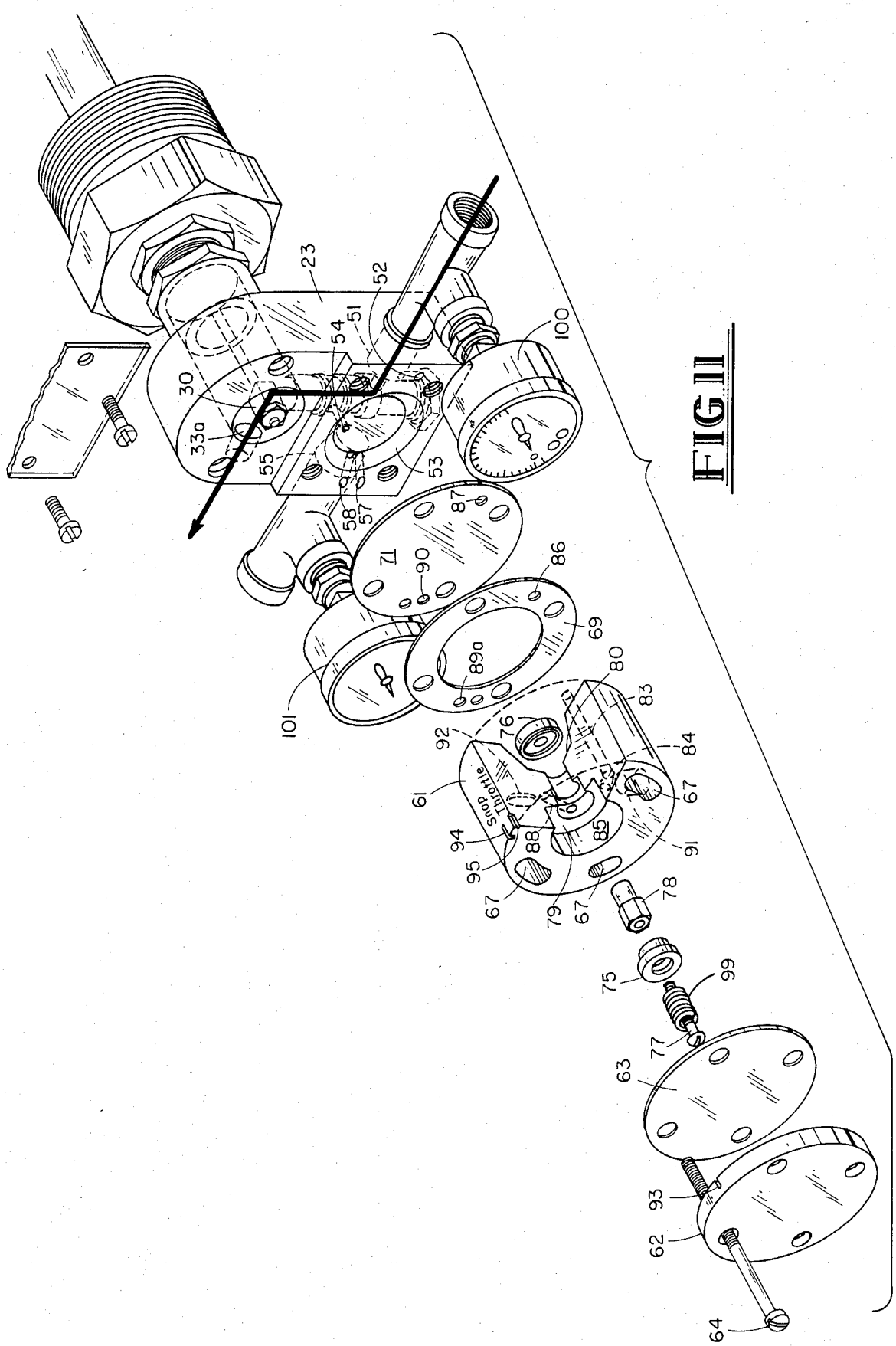
FIG. 11 is an exploded partial view showing the device in the throttling mode.
Figure 12:
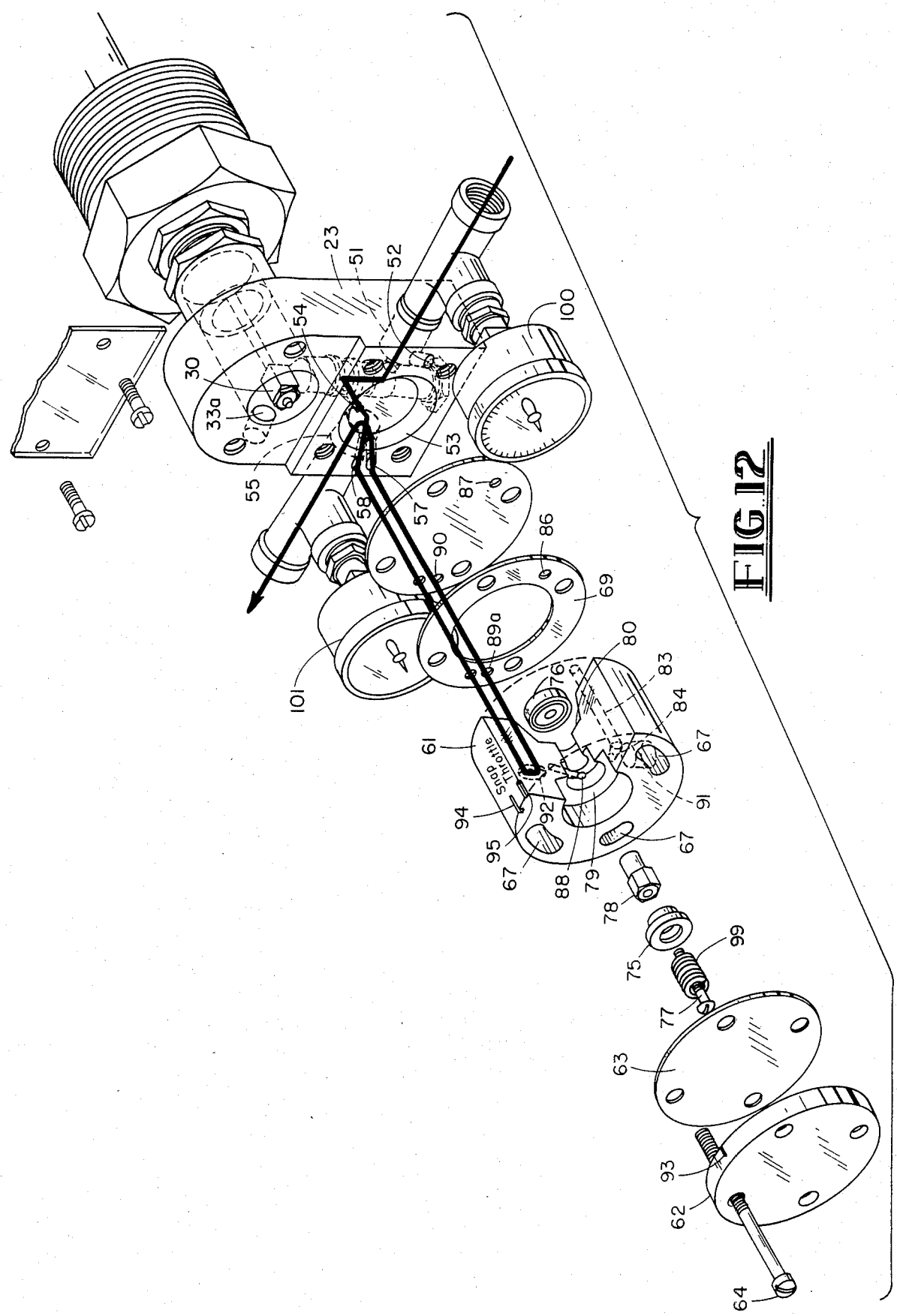
FIG. 12 is an exploded partial view showing the device in the throttling mode.

In order to change the booster body 61 to the throttling mode, it is only necessary to slightly loosen the screws 64 to allow rotation of the booster body 61 counterclockwise within the limits of the slotted opening 67 until the indicator mark 95 aligns with the indicator mark 93 on the cover 62. At this point, the passageway 52 does not align with the passageway 83 and is blocked. Also the recess slot 92 communicates with both passageways 57 and 58. If the sensing rod seat 30 is as shown in FIG. 3, the gas flow of FIG. 12 results. The flow of pressurized gas is through the passageway 45 and 54, out the outlet 58, reversed by recess 92, and back through passageway 57, and out line 55. In the throttling mode, the gas actuated motor valve varies between a fully opened position and a partially closed position to vary the amount of fluid F which is exited out of the vessel. Again the adjusting screw member 34 can be adjusted to vary the distance between the orifice 50 and the sensing rod seat 30 to set the predetermined level of the fluid F in the vessel. If the fluid level of the vessel drops so that the sensing seat 30 rod is in the position shown in FIG. 2, the gas will also flow as shown in FIG. 11. The gas passes out through the orifice 50 and through the vent hole 33a. Thus, the throttling mode causes a basic gas flow of FIG. 12, with some flow being bled off, as shown in FIG. 11, depending upon the distance of the seat 30 from the orifice 50. As this distance increases, more gas is vented out the vent hole 33a. As the distance from the seat 30 to the orifice 50 begins to close, the amount of gas flowing through the vent hole 33a decreases and gradually increases the pressure which is supplied to the outlet line 55. The pressure of the gas flowing to the outlet line 55 is varying proportionally to the amount of gas vented through vent hole 33a. This provides a throttling mode and a substantially constant level of liquid in the vessel.

If it is desired to change to the snap-actor mode, the screws 64 need only be loosened to allow rotation of the booster body 61 so that the indicator mark 94 is aligned with the indicator mark 93 which again begins the operating steps described above in connection with FIGS. 8, 9 and 10.

As will be apparent, there are no elements which need to be switched or changed or elements which need to be completely removed from the apparatus to affect changing between the snap-actor mode and the throttling mode. All that needs to be done is to loosen the screws 64 so that the booster body 61 may be moved by rotating it within the limits of the slotted opening 67 so that the indicator marks 94 and 95 are alternately aligned with the indicator mark 93.

Although the invention has been described in conjunction with the foregoing specific embodiment, many alternatives, variations and modifications will be apparent to those of ordinary skill in the art. These alternatives, variations and modifications are intended to fall within the spirit and scope of the appended claims.

I claim:
1. A gas operated liquid level control apparatus comprising:
   sensing means for sensing the level of liquid in a vessel;
   control means for operably connecting the sensing means to a means for regulating the level of liquid in the vessel;
   the control means including a housing means;
   the control means being operable either in a snap-actor mode, which substantially maintains the liquid level in the vessel between predetermined levels, or a throttling mode, which substantially maintains the liquid level in the vessel at a predetermined level;
   the control means determining operation in a snap-actor mode or a throttling mode;
   means for flowing a gas through the control means;
   the sensing means determining whether the gas flows to the regulating means, to a means for venting the gas away from the apparatus, or both;
   the housing means being comprised of a gas inlet means, venting means, regulating connection means, member passageway means, control connection means, diaphragm control means, and orifice control means;
   the gas inlet means supplying gas to the apparatus from an outside source;
   the venting means allowing gas to pass from the apparatus to the outside of the device;
   the regulating connection means connecting the apparatus to the regulating means;
   the member passageway means connecting the gas inlet means to the diaphragm control means and orifice control means;
   the control connection means connecting the control means to the gas inlet means, the regulating connection means, and the diaphragm control means for the entrance and exit of gas to and from the control means;
   the diaphragm control means being comprised of a chamber on the housing means;
   the chamber abutting a diaphragm;
   the diaphragm control means collecting gas under pressure in the chamber;
   the orifice control means controlling the flow of gas from the member passageway means to the venting means;
   the orifice control means capable of being sealingly engaged by the sensing means;
   the control means being comprised of booster body means, diaphragm means and engaging means;
   the engaging means holding the booster body means and diaphragm means in a substantially air tight connection with the housing means;
   the engaging means capable of being loosened or removed from the housing means to allow rotation of the booster body means and/or the diaphragm means, and then retightened or re-engaged with the housing means;
   the booster body means being comprised of passageways, shuttle valves, and vents;
   the booster body means only being operable in the snap-actor mode;
   the passageways being aligned with the control connection means while in the snap-actor mode, but not being aligned with the control connection means in the throttling mode;
   while in the snap-actor mode, the passageways being blocked by the shuttle valves when the gas is allowed to pass through the venting means;
   while in the snap-actor mode, the passageways connecting the gas inlet means and regulating connection means by the control connection means when gas is prevented from passing through the venting means by the sensing means;

while in the snap-actor mode, the vents venting the passageways to the exterior of the booster body means when the shuttle valves are forced into a position allowing passage of gas through the passageways of the booster body means;
the shuttle valves being forced into such position by the action of the diaphragm means.

2. A liquid level control apparatus for connecting to a fluid vessel and controlling the volume of fluid in the vessel, comprising:
means for sensing the volume of fluid in the vessel;
control means for operably connecting the sensing means to a means for regulating the volume of fluid in the vessel;
the control means being operable either in a snap actor mode, which substantially maintains the fluid level in the vessel between predetermined levels, or a throttling mode, which substantially maintains the fluid level in the vessel at a predetermined level;
the control means including means for changing between the snap actor mode and the throttling mode without removing from or adding to the control means any new parts;
the control means includes a diaphragm means and engaging means;
the engaging means securing a portion of the control means into a substantially sealing engagement with the rest of the control means;
change between the throttling mode and snap actor mode being accomplished by rotation of a portion of the control means;
the diaphragm means deflecting to correspond to differences in pressure in the control means;
the control means includes a cover means and a booster body means;
the engaging means holding the cover means against the booster body means in a sealing engagement;
the cover means being held stationary by the engaging means; and
the booster body means being capable of rotating within limits determined by the engaging means.

3. A liquid level control apparatus for controlling the level of liquid in a vessel in either a throttling mode or a snap-action mode, comprising:
sensing means mounted on said vessel;
a control housing mounted on said sensing means;
said control housing operably connected to a gas supply means and a liquid level control means;
said sensing means operable within said control housing to substantially regulate the flow of a gas from said gas supply means to said liquid level control means;
a booster body operable to be sealingly mounted on said control housing in at least two positions;
the first position operating said apparatus in said throttling mode and substantially containing said gas within said control housing;
the second position operating said apparatus in said snap-action mode and allowing flow of said gas through at least a portion of said booster body; and
change between said first and second position being accomplished without the removal or addition of any parts to said apparatus by movement of said booster body.

4. A liquid level control apparatus for controlling the level of liquid in a vessel in either a throttling mode or a snap-action mode, comprising:
sensing means mounted on said vessel;
a control housing mounted on said sensing means;
said control housing operably connected to a gas supply means and a liquid level control means;
said sensing means operable within said control housing to substantially regulate the flow of a gas from said gas supply means to said liquid level control means;
a booster body operable to be sealingly mounted on said control housing in at least two positions;
the first position operating said apparatus in said throttling mode and substantially containing said gas within said control housing;
the second position operating said apparatus in said snap-action mode and allowing flow of said gas through at least a portion of said booster body;
change between said first and second position being accomplished without the removel or addition of any parts to said apparatus by movement of said booster body;
said control housing is comprised of a member passageway through a portion of its height, a cavity, a member, an inlet passage, an outlet passage, and booster body operating means;
said member is fixably held within said member passageway;
said member is operably connected to said inlet passage, said cavity, said outlet passage, and said booster body operating means;
said member passes said gas to said cavity through an orifice; and
said sensing means is operable to substantially close or open said orifice in response to changes in the level of liquid in said vessel.

5. A liquid level control apparatus for controlling the level of liquid in a vessel in either a throttling mode or a snap-action mode, comprising:
sensing means mounted on said vessel;
a control housing mounted on said sensing means;
said control housing operably connected to a gas supply means and a liquid level control means;
said sensing means operable within said control housing to substantially regulate the flow of a gas from said gas supply means to said liquid level control means;
a booster body operable to be sealingly mounted on said control housing in at least two positions;
the first position operating said apparatus in said throttling mode and substantially containing said gas within said control housing;
the second position operating said apparatus in said snap-action mode and allowing flow of said gas through at least a portion of said booster body;
change between said first and second position being accomplished without the removal or addition of any parts to said apparatus by movement of said booster body;
booster body operating means operably connect said control housing and said booster body;
said booster body operating means is comprised of at least three passageways, a diaphragm and a recess;
the first of said passageways operably connecting said inlet passage to said booster body;
the second of said passageways operably connecting said booster body to said outlet passage;
the third of said passageways connecting said member to said recess;
said diaphragm sealingly covering said recess;

said booster body is comprised of at least three booster body passageways, shuttle valve means; a fourth passageway and control housing engaging means;

said shuttle valve means is mounted in said fourth passageway extending substantially through the length of said booster body;

said fourth passageway operable to connect said first, second and third booster body passageways;

the first of said booster body passageways operably connecting said first booster body operating means passageway to said fourth passageway at a first point when said booster body is in said second position;

the second of said booster body passageways connecting said second booster body operating means passageway to said fourth passageway at a second point when said booster body is in said second position;

the third of said booster body passageways connecting a vent hole on said booster body to said fourth passageway at a third point;

said shuttle valve means operable to seal said fourth passageway between said first and second points or between said second and third points; and said control housing engaging means holding said booster body in sealing engagement with said diaphragm and control housing.

6. The apparatus as set forth in claim 5, wherein:
said recess is a substantially conical recess.

7. The apparatus as set forth in claim 6, wherein;
said liquid level control means is comprised of a gas activated motor valve.

8. The apparatus as set forth in claim 7, additionally comprising:
a sight glass mounted on said control housing for viewing the operation of said sensing seat from the exterior of said control housing.

9. A liquid level control apparatus for controlling the level of liquid in a vessel in either a throttling mode or a snap-action mode, comprising:
sensing means mounted on said vessel;
a control housing mounted on said sensing means;
said control housing operably connected to a gas supply means and a liquid level control means;
said sensing means operable within said control housing to substantially regulate the flow of a gas from said gas supply means to said liquid level control means;
a booster body operable to be sealingly mounted on said control housing in at least two positions;
the first position operating said apparatus in said throttling mode and substantially containing said gas within said control housing;
the second position operating said apparatus in said snap-action mode and allowing flow of said gas through at least a portion of said booster body;
change between said first and second position being accomplished without the removal or addition of any parts to said apparatus by movement of said booster body;
said control housing is comprised of a member passageway through a portion of its height, a cavity, a member, an inlet passage, an outlet passage, and booster body operating means;
said member is fixably held within said member passageway;

said member is operably connected to said inlet passage, said cavity, said outlet passage, and booster body operating means;
said member passes said gas to said cavity through an orifice;
said sensing means is operable to substantially close or open said orifice in response to changes in the level of liquid in said vessel;
booster body operating means operably connect said control housing and said booster body;
said booster body operating means is comprised of at least three passageways, a diaphragm and a recess;
the first of said passageways operably connecting said inlet passage to said booster body;
the second of said passageways operably connecting said booster body to said outlet passage;
the third of said passageways connecting said member to said recess;
said diaphragm sealingly covering said recess;
said booster body is comprised of at least three booster body passageways, shuttle valve means, a fourth passageway and control housing engaging means;
said shuttle valve means is mounted in said fourth passageway extending substantially through the length of said booster body;
said fourth passageway operable to connect said first, second and third booster body passageways;
the first of said booster body passageways operably connecting said first booster body operating means passageway to said fourth passageway at a first point when said booster body is in said second position;
the second of said booster body passageways connecting said second booster body operating means passageway to said fourth passageway at a second point when said booster body is in said second position;
the third of said booster body passageways connecting a vent hole on said booster body to said fourth passageway at a third point;
said shuttle valve means operable to seal said fourth passageway between said first and second points or between said second and third points; and
said control housing engaging means holding said booster body in sealing engagement with said diaphragm and control housing.

10. A liquid level control apparatus for controlling the level of liquid in a vessel in either a throttling mode or a snap-action mode, comprising:
sensing means mounted on said vessel;
a control housing mounted on said sensing means;
said control housing operably connected to a gas supply means and a liquid level control means;
said sensing means operable within said control housing to substantially regulate the flow of a gas from said gas supply means to said liquid level control means;
a booster body operable to be sealingly mounted on said control housing in at least two positions;
the first position operating said apparatus in said throttling mode and substantially containing said gas within said control housing;
the second position operating said apparatus in said snap-action mode and allowing flow of said gas through at least a portion of said booster body;
change between said first and second position being accomplished without the removal or addition of any parts to said apparatus by movement of said booster body;

said control housing is comprised of a member passageway through a portion of its height, a cavity, a member, an inlet passage, an outlet passage, and booster body operating means;

said member is fixably held within said member passageway;

said member is operably connected to said inlet passage, said cavity, said outlet passage, and said booster body operating means;

said member passes said gas to said cavity through an orifice;

said sensing means is operable to substantially close or open said orifice in response to changes in the level of liquid in said vessel;

booster body operating means operably connect said control housing and said booster body;

said booster body operating means is comprised of at least three passageways, a diaphragm and a recess;

the first of said passageways operably connecting said inlet passage to said booster body;

the second of said passageways operably connecting said booster body to said outlet passage;

the third of said passageways connecting said member to said recess;

said diaphragm sealingly covering said recess;

said booster body is comprised of at least three booster body passageways, shuttle valve means, a fourth passageway and control housing engaging means;

said shuttle valve means is mounted in said fourth passageway extending substantially through the length of said booster body;

said fourth passageway operable to connect said first, second and third booster body passageways;

the first of said booster body passageways operably connecting said first booster body operating means passageway to said fourth passageway at a first point when said booster body is in said second position;

the second of said booster body passageways connecting said second booster body operating means passageway to said fourth passageway at a second point when said booster body is in said second position;

the third of said booster body passageways connecting a vent hole on said booster body to said fourth passageway at a third point;

said shuttle valve means operable to seal said fourth passageway between said first and second points or between said second and third points;

said control housing engaging means holding said booster body in sealing engagement with said diaphragm and control housing;

said shuttle valve means is comprised of a first seat, a second seat, connecting means and biasing means;

said connecting means maintaining said first and second seats in a spaced relationship; and said biasing means connected to said seats and connecting means in a manner to bias said shuttle valve means toward the position at which said fourth passageway is sealed between said first and second points.

11. The apparatus as set forth in claim 10, wherein:
said control housing engaging means are comprised of screws;
said screws passing through longitudinal slotted passageways in said booster body and inthreadably engage said control housing; and
said screws sealingly hold said booster body to said diaphragm and control housing by a cover.

12. The apparatus as set forth in claim 11, wherein:
said screws additionally pass through holes in said diaphragm.

13. A liquid level control apparatus for controlling the level of liquid in a vessel in either a throttling mode or a snap-action mode, comprising:
sensing means mounted on said vessel;
a control housing mounted on said sensing means;
said control housing operably connected to a gas supply means and a liquid level control means;
said sensing means operable within said control housing to substantially regulate the flow of a gas from said gas supply means to said liquid level control means;
a booster body operable to be sealingly mounted on said control housing in at least two positions;
the first position operating said apparatus in said throttling mode and substantially containing said gas within said control housing;
the second position operating said apparatus in said snap-action mode and allowing flow of said gas through at least a portion of said booster body;
change between said first and second position being accomplished without the removal or addition of any parts to said apparatus by movement of said booster body;
said sensing means is comprised of a float, a cantilever rod, a sensing rod, a sensing seat, vessel connecting means, and control housing connecting means;
said float mounted on one end of said cantilever rod, the other end of said cantilever rod fixably held by said vessel connecting means;
said vessel connecting means flexibly holding said cantilever rod inside a vessel;
said sensing rod flexibly mounted within said cantilever rod and extending within said control housing;
said sensing seat mounted on the end of said cantilever rod within said control housing; and
said control housing connecting means fixably holding said control housing to said sensing means.

14. An apparatus for controlling the level of liquid in a vessel, comprising:
means for sensing the level of liquid in said vessel;
control means for operably connecting said sensing means to a means for regulating the volume of fluid in said vessel;
said control means being comprised of control housing means and booster body means;
said booster body means for changing between a snap-actor mode or a throttling mode;
said changing between the snap-actor mode and the throttling mode being accomplished without removing from the control means any parts or adding to the control means any parts by movement of said booster body parts;
said regulating means being operated by the flow of a gas through said control means;
said flow of said gas through said control means engaging said booster body means only in the snap-actor mode.

15. A method for changing a liquid level control device from a snap-actor mode of operation to a throttling mode of operation, comprising the steps of:

flowing a gas through both the throttling and snap-actor portion of said device;

changing the orientation of a booster body without removing from or adding to said device any parts by movement of said booster body; and sealing the flow of gas inside said throttling portion of said device.

16. The method as set forth in claim 15, wherein:

said changing of the orientation of said booster body is accomplished by rotating said booster body so that passageways in said booster body are not aligned with passageways in the remainder of said device.

17. The method as set forth in claim 16, wherein:

said rotation is accomplished by loosening engaging means which sealingly hold said booster body to the remainder of said device, rotating said booster body, and retightening said engaging means.

* * * * *